United States Patent
Lahman et al.

(10) Patent No.: US 10,353,700 B1
(45) Date of Patent: Jul. 16, 2019

(54) CODE BASE SHARING BETWEEN STANDALONE AND WEB-BASED VERSIONS OF AN APPLICATION VIA AN EMULATED NETWORK COMMUNICATION CHANNEL

(71) Applicant: Microsoft Technology Licensing, LLC, Redmond, WA (US)

(72) Inventors: Aaron R. Lahman, Redmond, WA (US); Yasser E. Shaaban, Seattle, WA (US); Mariyan Fransazov, Kirkland, WA (US); Aleksey S. Kabanov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/985,412

(22) Filed: May 21, 2018

(51) Int. Cl.
    *G06F 9/44* (2018.01)
    *G06F 8/71* (2018.01)
    (Continued)

(52) U.S. Cl.
    CPC ............... *G06F 8/71* (2013.01); *G06F 8/76* (2013.01); *G06F 9/455* (2013.01); *H04L 67/02* (2013.01)

(58) Field of Classification Search
    CPC ... G06F 17/24; G06F 8/30; G06F 8/33; G06F 8/20; G06F 8/427
    (Continued)

(56) References Cited

U.S. PATENT DOCUMENTS 7,761,848 B1   7/2010   Chaffin
8,886,822 B2 * 11/2014   Pedersen ............... H04L 67/34
    709/231
(Continued)

FOREIGN PATENT DOCUMENTS

EP    2259180 A1   12/2010

OTHER PUBLICATIONS

"Convert Your PHP Web Application to a Native Desktop Application (Win, Linux, Mac)!", Retrieved from: «https://www.sitepoint.com/community/t/convert-your-php-web-application-to-a-native-desktop-application-win-linux-mac/36520», Nov. 7, 2013, 7 Pages.

(Continued)

*Primary Examiner* — Chuck O Kendall
(74) *Attorney, Agent, or Firm* — Fiala & Weaver P.L.L.C.

(57) ABSTRACT

Techniques are described herein for the development of an application that includes both standalone and web-based versions. Both versions share substantial portions of code, thereby minimizing the disparity between the versions in terms of function and user experience. The foregoing also enables the web-based application to be operable in an offline environment. This may be achieved by separating both the standalone and the offline web-based versions into a client portion and a server portion, but having both portions executing on the client. Instead of facilitating communication between these portions via a network communication channel, communication is performed via an emulated network communication channel, which translates network requests and responses provided by these portions into a format suitable for transmission over the emulated network communication channel. By doing so, these portions can be reused and function identically in standalone versions, online web-based versions, and offline web-based versions of the application.

20 Claims, 10 Drawing Sheets

(51) Int. Cl.
  *H04L 29/08*    (2006.01)
  *G06F 9/455*    (2018.01)
  *G06F 8/76*     (2018.01)
(58) Field of Classification Search
  USPC .......................................................... 717/112
  See application file for complete search history.

(56) References Cited

U.S. PATENT DOCUMENTS

2005/0108678 A1   5/2005   Goodwin et al.
2011/0239127 A1   9/2011   Meng et al.

OTHER PUBLICATIONS

"Java RMI—Introduction", Retrieved from: «https://www.tutorialspoint.com/java_rmi_java_rmi_introduction.htm», Retrieved on: Feb. 27, 2018, 4 Pages.
"React Desktop Apps", Retrieved from: «https://github.com/ServiceStackApps/ReactDesktopApps», Retrieved on: Feb. 27, 2018, 15 Pages.
"Application as Filed in U.S. Appl. No. 15/420,001", Filed Date: Jan. 30, 2017, 58 Pages.
Ellis, Matthew, "The Client Side Web Service Proxy", in Publication of Magma Interactive, Retrieved on: Feb. 27, 2018, 1 Page.
Williams, Rion, "Bringing Your Web Application to Desktop Life with Electron", Retrieved from: «http://rion.o/2016/12/02/bringing-your-web-application-to-desktop-life-with-electron/», Dec. 2, 2016, 9 Pages.

\* cited by examiner

CODE BASE SHARING BETWEEN STANDALONE AND WEB-BASED VERSIONS OF AN APPLICATION VIA AN EMULATED NETWORK COMMUNICATION CHANNEL

BACKGROUND

Software applications that come in both standalone desktop versions and web-based versions can suffer from a large array of disparities between them, both in function and user experience. This is due to the fact that each version utilizes a different application code base. Developing and maintaining different application code bases can be very costly, even if there are many similarities between the them. Developers will carry over expectations and assumptions from one code base to the other where they do not apply and will introduce bugs that can be costly to sort out. Often times, the bugs are not detected until the application is deployed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to the development of an application that includes both a standalone desktop version and a web-based version. Both versions of the application share substantial portions of code, thereby minimizing the disparity between the versions in terms of function and user experience. The foregoing also enables the web-based application to be operable in an offline environment. This may be achieved by separating both the standalone and the offline web-based versions of the application into a client portion and a server portion, each of which being configured to issue and receive network requests, but having both portions executing on the client. Instead of facilitating communication between these portions via a network communication channel, as is performed for a web-based implementation of the application that operates in an online environment, communication is performed via an emulated network communication channel, which translates network requests and responses provided by the client portion and the server portion into a format suitable for transmission over the emulated network communication channel. By doing so, the client portions and the server portions can be reused and function identically in standalone versions, online web-based versions, and offline web-based versions of the application. The emulated network communication channel may have minor differences depending on whether it is implemented in the standalone version or the offline web-based version. However, the development and testing of the emulated network channel between the two versions is minimal when compared to having to develop and test the client and server portions for the web-based version and the standalone application equivalent, which are significantly larger portions of code.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
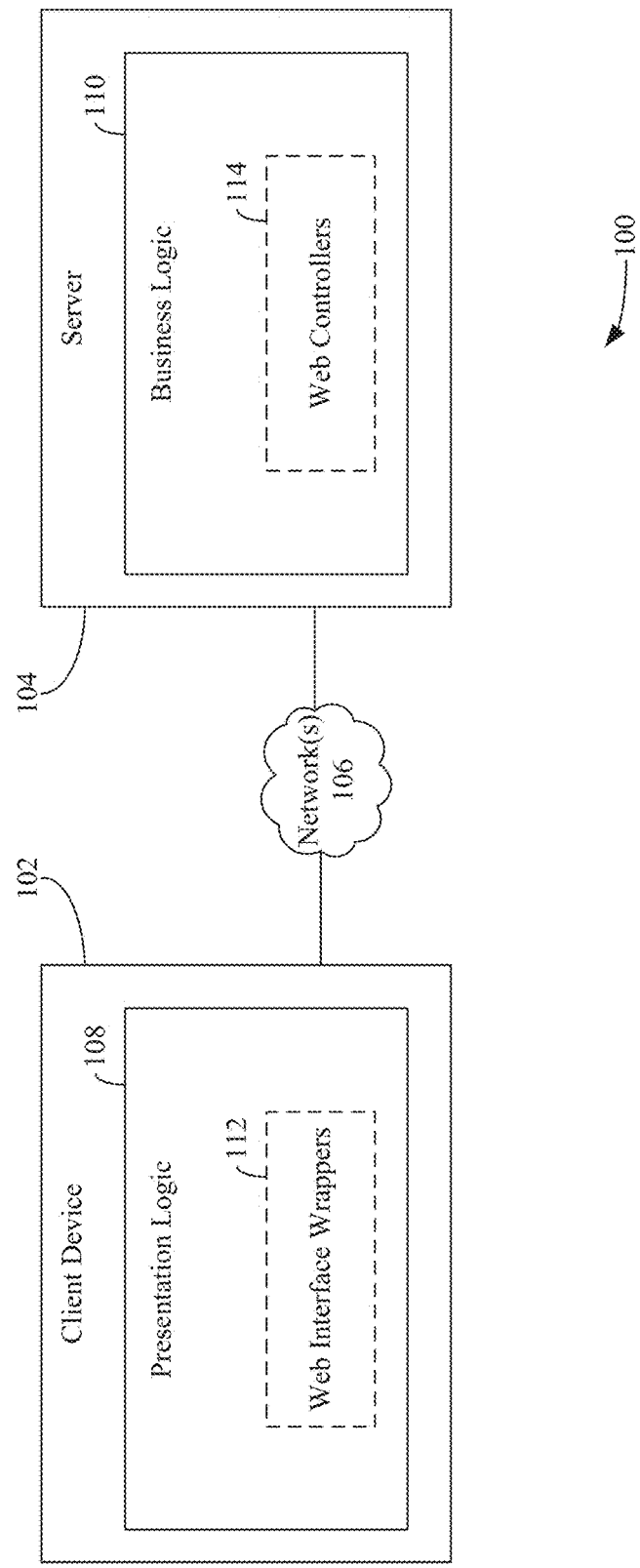
FIG. 1 depicts a block diagram of a system for implementing and executing a web-based application in accordance with example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. System and Method for Implementing and Executing a Standalone Version and a Web-Based Version of an Application Utilizing a Substantially Identical Code Base Embodiments described herein are directed to the development of an application that includes both a standalone desktop version and a web-based version. Both versions of the application share substantial portions of code, thereby minimizing the disparity between the versions in terms of function and user experience. The foregoing also enables the web-based application to be operable in an offline environment. This may be achieved by separating both the standalone and the offline web-based versions of the application into a client portion and a server portion, each of which being configured to issue and receive network requests, but having both portions executing on the client. Instead of facilitating communication between these portions via a network communication channel, as is performed for a web-based implementation of the application that operates in an online environment, communication is performed via an emulated network communication channel, which translates network requests and responses provided by the client portion and the server portion into a format suitable for transmission over the emulated network communication channel. By doing so, the client portions and the server portions can be reused and function identically in standalone versions, online web-based versions, and offline web-based versions of the application. The emulated network communication channel may have minor differences depending on whether it is implemented in the standalone version or the offline web-based version. However, the development and testing of the emulated network channel between the two versions is minimal when compared to having to develop and test the client and server portions for the web-based version and the standalone application equivalent, which are significantly larger portions of code.

The foregoing techniques may advantageously improve the performance of the computing device on which the application is executing. Conventional techniques implement web-based applications using a client-server architecture, where portions of the application are executed on the client and other portions of the application are executed on the server. This requires the client and server to communicate with each other over the network, which can introduce an undesirable amount of latency. This network latency is further compounded when considering the hundreds or even thousands of network transactions that are communicated during execution of the application. Processing network transactions also introduces additional processing overhead due to the context switching and memory copy transactions that are required when transmitting data over the network. By having both the client and server portions executing on the client, the network latency is eliminated, thereby enabling the application to execute more efficiently. The efficient execution of the application reduces the processing overhead normally required to execute an application using a client-server model and also consumes less power.

FIG. 1 is a block diagram of a system 100 for implementing and executing a web-based application in accordance with an embodiment. As shown in FIG. 1, system 100 includes a client device 102 and a server 104 communicatively coupled via one or more networks 106. Client device 102 may comprise any of a wide variety of computing devices mentioned herein or otherwise known, including but not limited to a desktop computer, a tablet computer, a laptop computer, a smart phone, etc. However, these examples are not intended to be limiting and client device 102 may include other types of devices other than those listed herein. Network(s) 106 may comprise one or more networks such as local area networks (LANs), wide area networks (WANs), enterprise networks, the Internet, etc., and may include one or more of wired and/or wireless portions.

System 100 may be referred to as a client-server architecture. In accordance with such an architecture, an application programmer decomposes the application being developed thereby into a number of different components (referred to as "application components"). The programmer separates the application into a client portion that executes on client device 102 and a server portion that executes on one or more servers (e.g., server 104). For example, as further shown in FIG. 1, client device 102 includes presentation logic 108, and server 104 includes business logic 110, which are components of the web-based application. The web-based application may be also referred to as a software as a service (SaaS) application. Presentation logic 108 may comprise software components that cause GUI components (e.g., menus, buttons, text boxes, etc.) to be rendered on a display of client device 102, enable a user to interact with the GUI components (e.g., select and/or provide input via GUI components), etc. Business logic 110 may comprise software components that perform operations (e.g., data manipulation (e.g., mathematical operations), data retrieval (e.g., from a database), etc.) on or enforce rules with respect to the input provided by the user via presentation logic 108. The results of the operations or rule enforcement are provided to the user via presentation logic 108.

The web-based application may be executed when client device 102 accesses a web site hosted by server 104 that includes the web-based application. For example, when a user accesses server 104 using a web browser (not shown), presentation logic 108 may begin execution in the web browser. Accordingly, presentation logic 108 may be written in a programming language that is executable in a web browser (e.g., JavaScript or TypeScript). Business logic 110 is configured for execution on server 104 and may be implemented using a different programming language (e.g., C#).

While components within a device are able to intercommunicate using method calls (i.e., components of presentation logic 108 of client device 102 may intercommunicate with each other and components of business logic 110 of server 104 may intercommunicate with each other), most programming languages do not allow normal method calls across network(s) 106. To solve this issue, client device 102 may further include web interface wrappers 112, and server 104 may further include web controllers 114. As shown in FIG. 1, web interface wrappers 112 may be included as part of presentation logic 108 and web controllers 114 may be included as part of business logic 110. However, embodiments described herein are not so limited. For example, web interface wrappers 112 may be a component that is separate from and communicatively coupled to presentation logic 108, and web controllers 114 may be a component that is separate from and communicatively coupled to business logic 110.

For each method implemented by business logic 110, a corresponding web interface wrapper 112 and web controller 114 may be implemented. Given that any given application can have thousands of different method calls, developing a web interface wrapper 112 and a web controller 114 for each method can be quite cumbersome. This process may be simplified by auto-generating web interface wrappers 112 and web controllers 114 in accordance with the embodiments described in U.S. patent application Ser. No. 15/419,982, filed Jan. 30, 2017, and titled "Synchronization of Property Values Between a Client and a Server," and U.S. patent application Ser. No. 15/420,001, filed Jan. 30, 2017, and titled "Object-Oriented Remote Procedure Calls for Browser Applications," the entireties of which are incorporated by reference herein.

When presentation logic 108 invokes a particular method, a corresponding web interface wrapper of web interface wrappers 112 generates one or more network request application programming interface (API) calls (e.g., hypertext transfer protocol (http) request API calls). The network request API calls may include a uniform resource identifier and a payload. The uniform resource identifier (URI) specifies an identifier (e.g., a uniform resource locator (URL) that identifies server 104 (e.g., http://www.example.com). The payload includes input parameters specified by the particular method invoked by presentation logic 108. The URI and/or the payload may also specify the name of the method. The corresponding web interface wrapper may translate the input parameters and/or the name of the method into a format that is suitable for transmission over network(s) 106. Issuance of the network request API call(s) results in the browser sending a network request including the URI and payload to server 104 via network(s) 106.

A corresponding web controller of web controllers(s) 114 may determine the method of business logic 110 to invoke by analyzing (e.g., parsing) the URI and/or payload of the received network request. The corresponding web controller also analyzes the payload to determine the input parameters that are to be provided to the determined method and invokes the determined method of business logic 110 with the determined input parameters. The results of the execution of the method are provided to client device 102 via a payload included in a network response. For example, the corresponding web controller may translate the results into a format that is suitable for transmission over network(s) 106 and generate one or more network response API call(s). Issuance of the network response API call(s) causes a network response that includes the payload to be transmitted to client device 102 via network(s) 106. The corresponding web interface wrapper receives the network response, analyzes the payload to determine the results, and provides the result to the method invoked by presentation logic 108.

Figure 2:
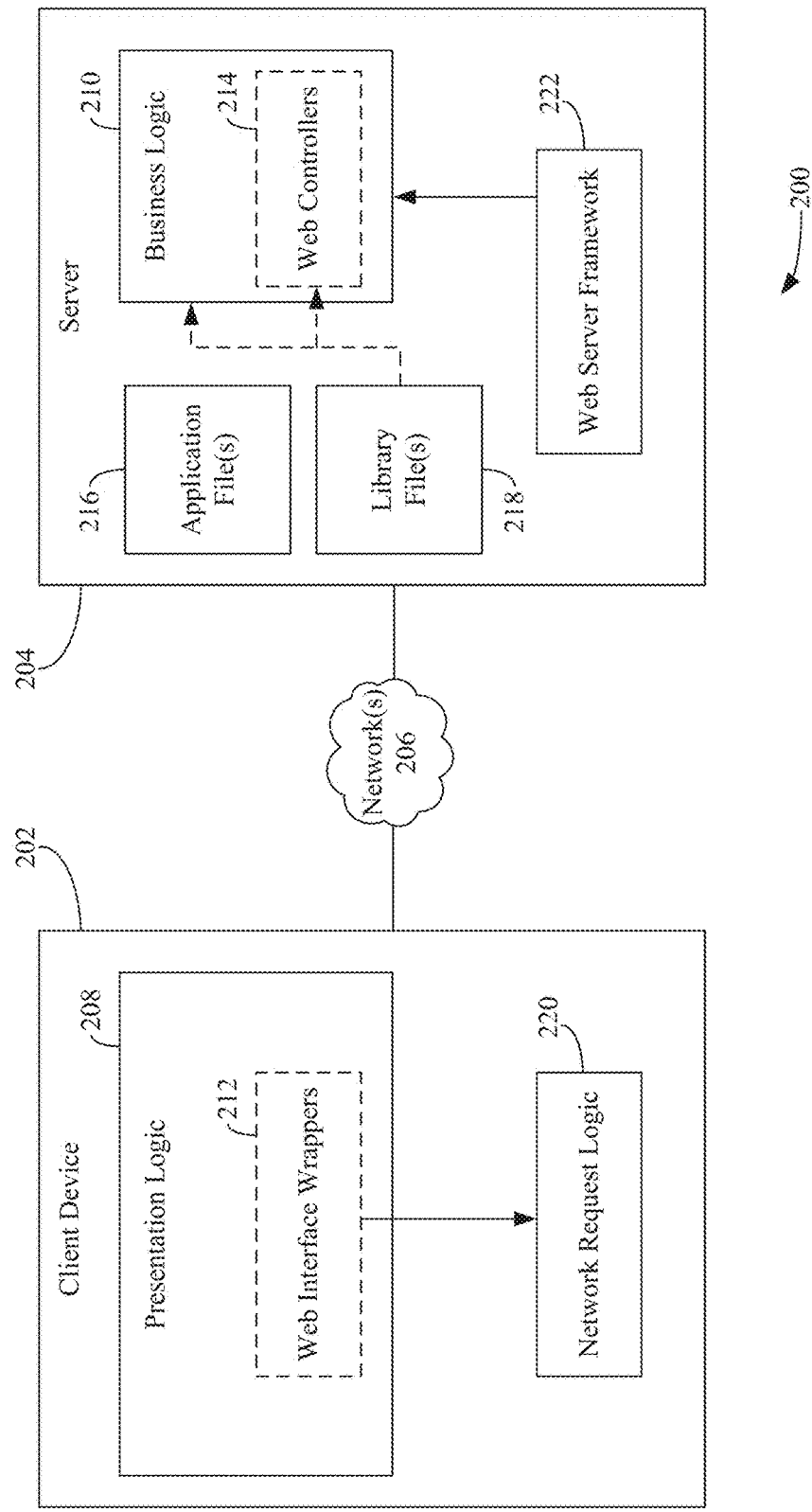
FIG. 2 depicts a block diagram of a system for implementing and executing a web-based application in accordance with another example embodiment.

Additional details regarding the client-server architecture of FIG. 1 are described below reference to FIG. 2. FIG. 2 is a block diagram of a system 200 for implementing and executing a web-based application in accordance with another embodiment. As shown in FIG. 2, system 200 includes a client device 202 and a server 204 communicatively coupled via one or more networks 206. Each of client device 202, server 204 and network(s) 206 are examples of client device 102, server 104 and network(s) 106, as described above with reference to FIG. 1. In the example shown in FIG. 2, client device 202 may access server 204 via a browser (not shown) executing on client device 202 and download one or more application files 216. Application file(s) 216 may be one or more JavaScript application files (e.g., .js file(s)), which comprise presentation logic 208 and web interface wrappers 212. Presentation logic 208 and web interface wrappers 212 execute within the browser and operate in a similar manner as described above with reference to presentation logic 108 and web interface wrappers 112. Business logic 210 and web controllers 214 may be implemented in a programming language that is different than a programming language that is used to implement presentation logic 208 and web interface wrappers 212. In particular, business logic 210 and web controllers 214 may be implemented using an object-oriented programming language, such as, but not limited to C#, and presentation logic 208 and web interface wrappers 212 may be implemented using a high-level, interpreted programming language such as JavaScript. Business logic 210 and web controllers 214 may be loaded on server 204 via one or more library files 218 stored locally on server 204 (e.g., on a hard disk included in server 204). Library file(s) 218 may comprise one or more dynamic link libraries (DLL files) that contain the functions (e.g., methods) and code that are implemented using the object-oriented programming language. Business logic 210 and web controllers 214 are examples of business logic 110 and web controllers 114, as described above with reference to FIG. 1.

As further shown in FIG. 2, client device 202 comprises network request logic 220, and server 204 comprises a web server framework 222. Network request logic 220 may comprise a network request object provided by the browser (e.g., an XmlHttpRequest object). Web server framework 222 is configured to receive network requests in accordance with a network request-response protocol, such as http. Web server framework 222 may be implemented using, for example and without limitation, ASP.Net.

When presentation logic 208 invokes a method of business logic 210, a web interface wrapper of web interface wrappers 212 corresponding to the invoked method determines the input parameters to be provided to the method and causes a network request to be issued that specifies the URI of server 204 (e.g., www.example.com) and the input parameters. The URI may further specify the method to be invoked by business logic 210 (e.g., www.example.com/method name). To issue a network request, the corresponding web interface wrapper may first initialize the request by invoking an open method of the network request object (e.g., XmlHttpRequest.open( )) of network request logic 220. The corresponding web interface wrappers may specify the URI of the server to which the request is to be sent (i.e., server 204) when invoking the open method. Thereafter, the corresponding web interface wrapper may invoke a send method of the network request object (e.g., XmlHttpRequest.send( )) that specifies the input parameters in the payload (e.g., message body) of the network request.

Before transmitting the payload, the corresponding web interface wrapper may translate the input parameters into a format that is suitable for network transmission. For instance, the network request object may not support certain parameter types (e.g., integers) or multiple parameters and/or only support certain parameter types (e.g., strings or byte arrays). Thus, the corresponding web interface wrapper may translate the input parameters into a suitable format for the network transmission, such as a string payload or byte array payload.

For example, suppose presentation logic 208 invokes an "add" method with input parameters '2' and '3' (i.e., presentation logic 208 requires that numbers 2 and 3 are to be added via a method configured to add two integers). The corresponding web interface wrapper may represent the input parameters as a string (e.g., "2;3", where input parameters are '2' and '3' are delimitated by a semicolon). The name of the method may be further specified in the string (e.g., "add;2;3"). After translating the input parameters, the corresponding web interface wrapper may invoke a send method of network request logic 220 that includes the translated input parameters as part of the payload, and network request logic 220 transmits the network request to server 204.

Web server framework 222 is configured to receive the network request. Web server framework 222 may analyze the URI and/or payload to determine the method invoked by presentation logic 208 and provides a network request object corresponding to the network request to a web controller corresponding to the method invoked by presentation logic 208. Before providing the network request object, web server framework 222 may convert the string payload to a format suitable for processing by web controllers 214 and business logic 210. For example, in an embodiment in which business logic 210 and web controllers 214 are implemented using C#, web server framework 222 may convert the string payload to a stream payload and include the stream payload in the network request object. Upon receiving the network request object, the corresponding web controller may analyze the payload to determine the input parameters and invoke the method of business logic 210 with the determined input parameters.

The embodiments described with reference to FIGS. 1 and 2 require the client device to be connected to the network due to a portion of the web-based application (i.e., the business logic) being executed on the server. However, certain techniques may be utilized to enable a web-based application to be executed offline (i.e., without requiring the client device to remain connected to a network).

Figure 3:
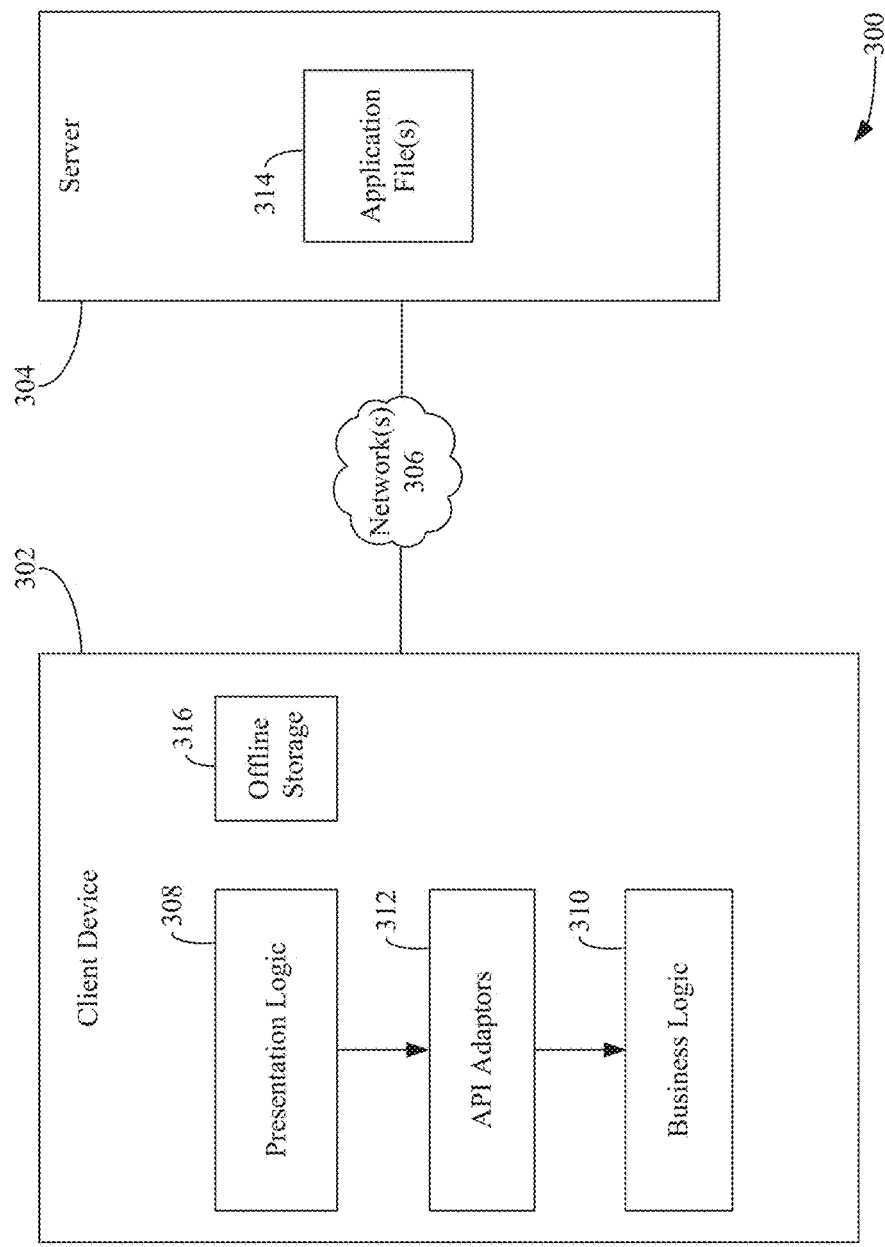
FIG. 3 depicts a block diagram of a system for implementing and executing a web-based application that is operable in an offline environment in accordance with an example embodiment.

For example, FIG. 3 is a block diagram of a system 300 for implementing and executing a web-based application that is operable in an offline environment in accordance with an example embodiment. As shown in FIG. 3, system 300 includes a client device 302 and a server 304 communicatively coupled via one or more networks 306. Each of client device 302, server 304 and network(s) 306 are examples of client device 202, server 204 and network(s) 206, as described above with reference to FIG. 2. In the example shown in FIG. 3, client device 302 may access server 304 via a browser (not shown) executing on client device 302 and download one or more application files 314. Application file(s) 314 may be one or more files that comprise code that is executable within the browser (e.g., JavaScript or TypeScript code). Application file(s) 314 comprise presentation logic 308, business logic 310 and API adaptors 312. Application file(s) 314 may be stored in offline storage 316 associated with the browser. Data stored in offline storage 316 is stored locally on client device 302 and therefore accessible to the browser when client device 302 is not connected to network(s) 306. Data may be stored and accessed by the browser via APIs of offline storage 316 (e.g., a Web Storage API, File Access API, etc.).

When a user attempts to access server 304 (e.g., by typing the server's URL into a browser) and client device 302 is offline, the browser may detect that the network request to server 304 has failed and determine whether the application is locally stored in offline storage 316. If the browser determines that application is stored in offline storage 316, the browser executes presentation logic 308, business logic 310 and API adaptors 312. Presentation logic 308 and business logic 310 operate in a similar manner as described above with reference to presentation logic 208 and business logic 210 of FIG. 2. Because both presentation logic 308 and business logic 310 are executed locally in client device 302, the client-server network communication channel described above with reference to FIG. 2 (i.e., the communication between web interface wrappers 212, network request logic 220, web server framework 222, and web controllers 214) is not required. The functionality provided via web interface wrappers 212 and web controllers 214 (as described above with reference to FIG. 2) is provided by API adaptors 312. For example, API adaptors 312 may emulate the behavior of web interface wrappers 212 and web controllers 214 to determine the method of business logic 310 to be invoked and the input parameters to be provided to the method.

While the embodiment described above with reference to FIG. 3 enables a web-based application to be adapted for offline usage or as a standalone desktop application, significant changes must be made to the application. For instance, significant portions of the application must be rewritten in order for the application to be executed in the browser. For example, the developer must develop custom API adaptors (to replace the web interface wrappers and the web controllers) and also develop business logic in a programming language that is executable in a browser. Thus, the developer cannot merely reuse the business logic, web interface wrappers, and the web controllers that were developed when using a client-server model (as described above with reference to FIGS. 1 and 2) when developing a web-based application that is operable in an offline environment or a standalone application. The re-implementation of business logic can be expensive, and numerous bugs can be introduced when translating the business logic from one programming language to another (e.g., from C# to JavaScript). Additionally, over time it can be costly to keep the two versions of the business logic in sync. That is, every new feature that is added to one version of the business logic must also be implemented in another version of the business logic. Furthermore, both versions of the business logic will need to be debugged to work out subtle differences in behavior between the two. This can more than double the design costs for new features.

The following embodiments describe a technique to minimize the costs involved for developing and maintaining both a web-based version and a standalone desktop version of an application. In particular, the following embodiments enable the reuse of the presentation logic, web interface wrappers, web controllers and business logic for both standalone version and web application versions of an application. In other words, the same version of these components are reusable in both versions of the application. These components are executable on a single device (e.g., a client device), rather than distributing them between a client device and a server. By doing so, network latency is reduced or eliminated, as the presentation logic and business logic are no longer required to communicate over the network. In accordance with an embodiment, the foregoing may be accomplished by executing a local server on the client device. The local server executes the business logic and web controllers. Such an embodiment is described below with reference to FIG. 4. In accordance with another embodiment, the foregoing may be accomplished by utilizing an emulated network communication channel that communicatively couples the web interface wrappers and the web controllers. The web interface wrappers and web controllers are still configured to invoke and receive network request objects. However, the emulated network communication channel translates the request objects for suitable transmission over a non-network interface, as no network is used to communicate between these components due to all the components being executed locally on the client device. Such an embodiment is described below with reference to FIGS. 5 and 6. In either embodiment, the reuse of the majority of components enables different versions of an application (e.g., a standalone application or a web application) to have the same function and provide the same experience and also significantly reduces the engineering costs to develop and maintain the two versions.

Figure 4:
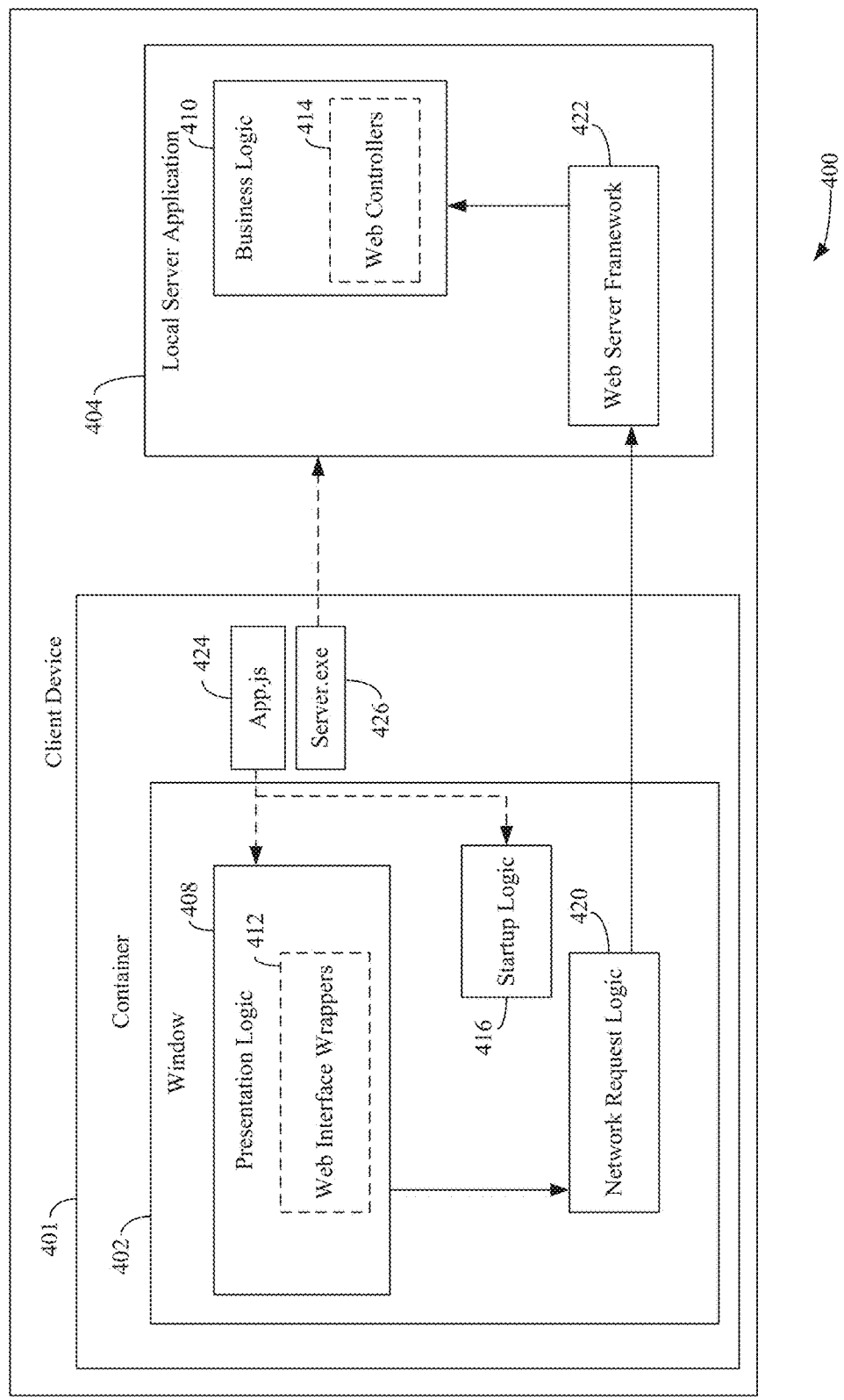
FIG. 4 depicts a block diagram of a system for implementing and executing a standalone desktop version of an application in accordance with an example embodiment.

FIG. 4 is a block diagram of a client device 400 for implementing and executing a standalone desktop version of an application in accordance with an embodiment. Client device 400 is an example of client device 202, as described above with reference to FIG. 2. The application may be developed using a framework that enables desktop applications to be built using standard web-based technologies, such as HTML, JavaScript and Cascading Style Sheets (CSS). Examples of such a framework include, but are not limited to, Electron™, PhoneGap®, Cordova™, etc. During execution of the application, portions of the application are executed within a container 401 provided by the framework (referred to as a "script application" or "script app"). The portion of the application that is written using web-based technologies execute within a browser-like window 402 provided by container 401. Container 401 may further provide platform APIs that enable the creation of a new process, enable file system manipulation, and other operations.

To install the application, client device 400 may download an executable file packaged by the framework from a server remotely located therefrom. The executable file may comprise one or more first files 424 (shown as App.js) and one or more second files 426 (shown as server.exe). First file(s) 424 may comprise code developed using a first programming language (e.g., JavaScript), and one or more second files may comprise code developed using a second programming language (e.g., C# code). First file(s) 424 comprise presentation logic 408, web interface wrappers 412 and startup logic 416, and second file(s) 426 may comprise an executable file that, when executed, launches local server application 404.

Upon execution of the application, window 402 is launched and executes presentation logic 408, web interface wrappers 412 and startup logic 416. Startup logic 416 is configured to execute second file(s) 426 to launch a new process (i.e., local server application 404) as a separate program executing on client device 400. Local server application 404 is configured to execute business logic 410, web controllers 414 and web server framework 422. Window 402 and local server application 404 are communicatively coupled via network request logic 420 and web server framework 422, which are examples of network request logic 220 and web server framework 222, as described above with reference to FIG. 2. Presentation logic 408, web interface wrappers 412, web controllers 414 and business logic 410 are examples of presentation logic 208, web interface wrappers 212, web controllers 214 and business logic 210, as also described above with reference to FIG. 2, and are configured to operate in a similar fashion.

For example, when presentation logic 408 invokes a method, a corresponding web interface wrapper of web interface wrappers 412 invokes a network request API call to network request logic 420, and network request logic 420 generates a network request in a similar manner as described above with reference to FIG. 2. However, because local server application 404 is executing on client device 402 (and not on a remotely-located server, as shown in FIG. 2.), the URI included in the network request specifies an identifier (e.g., a network address) of client device 400 (also referred to as a loopback address). This causes the network request to be routed to web server framework 422 (which is also executing on client device 400, and not a remotely-located server). Web server framework 422 provides a network request object to the corresponding web controller of web controllers 414, and the corresponding web controller invokes the method from business logic in a similar manner as described above with reference to FIG. 2.

The embodiment described in FIG. 4 advantageously provides a reduced network latency than compared to the embodiment described in FIG. 2. Moreover, because the application is wholly installed on client device 402, the application may be executed offline (i.e., no network connection is required to execute application). However, this embodiment does introduce overhead as network requests still need to be issued. To overcome this overhead, an emulated network communication channel in which no network requests are sent may be utilized in lieu of the embodiment described in FIG. 4 (while still using the same presentation logic, web interface wrappers, business logic and web controllers). The emulated network communication channel provides better throughput for the application also and eliminates network latency. Such an embodiment is described below with reference to FIGS. 5 and 6.

Figure 5:
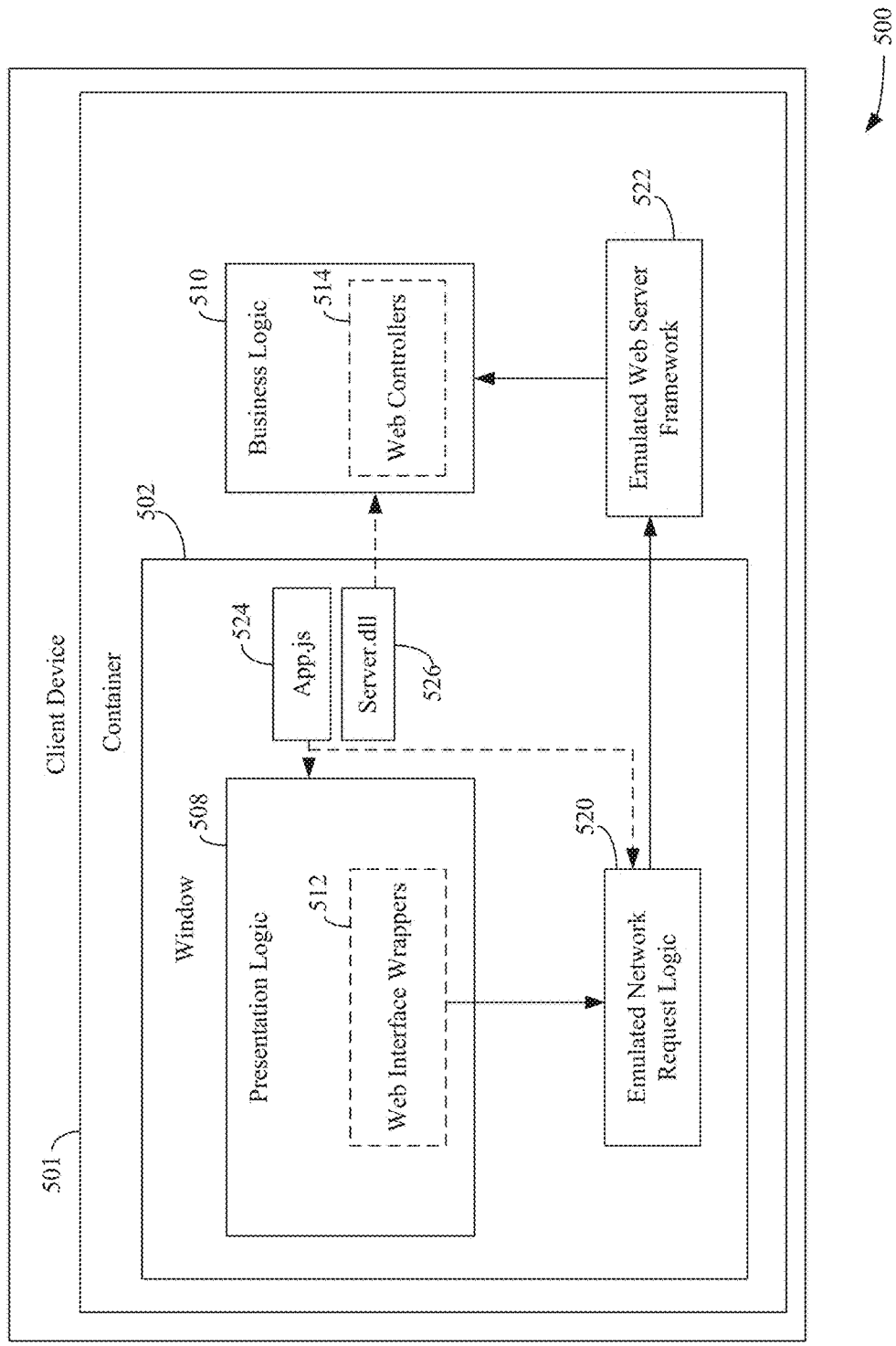
FIG. 5 depicts a block diagram of a computing device for implementing and executing a standalone desktop version of an application utilizing an emulated network communication channel in accordance with an example embodiment.

For example, FIG. 5 is a block diagram of a computing device 500 for implementing and executing a standalone desktop version of an application utilizing an emulated network communication channel in accordance with an example embodiment. Client device 500 is an example of client device 400, as described above with reference to FIG. 4. The application may be developed using a framework that enables desktop applications to be built using standard web technologies in a similar manner as described with reference to FIG. 4. During execution of the application, the entirety of the application is executed within a container 501 (i.e., a "script app") provided by the framework.

To install the application, client device 500 may download an executable file packaged by the framework from a server remotely located therefrom (not shown). The executable file may comprise one or more first files 524 (shown as App.js) and one or more second files 426 (shown as server.dll). First file(s) 524 may comprise code developed using a first programming language (e.g., JavaScript), and second file(s) 526 may comprise code developed using a second programming language (e.g., C# code). First file(s) 524 may comprise presentation logic 508, web interface wrappers 510, startup logic 516, and emulated network request logic 520, and second file(s) 526 may comprise DLL file(s) that contains methods and code that were implemented using the second programming language for implementing business logic 510 and web controllers 514. Presentation logic 508, web interface wrappers 512, business logic 510 and web controllers 514 are examples of presentation logic 408, web interface wrappers 412, business logic 410 and web controllers 414, as described above with reference to FIG. 4.

Upon execution of the application, window 502 is launched and executes presentation logic 508, web interface wrappers 512, and emulated network request logic 520. Container 501 may further execute a plug-in framework, thereby enabling window 502 to communicate with plug-ins executing within container 501. For example, emulated web server framework 522 may be a plug-in that is accessible by window 502 via a plug-in interface. Container 501 may further load second file(s) 524 and launch a process to execute business logic 510 and web controllers 514 within container 501.

When presentation logic 508 invokes a particular method of business logic 510, a corresponding web interface wrapper of web interface wrappers 512 generates network request API call(s) with the intent of causing a network request to be transmitted to a web server. For example, the corresponding web interface wrapper may first invoke an open method of a network request object (e.g., XmlHttpRequest.open( )), and subsequently invoke a send method of the network request object (e.g., XmlHttpRequest.send( )). However, the URI specified in the open method specifies emulated web server framework 522, rather than an actual web server as described above with reference to FIG. 2. The URI may further specify the method to be invoked by business logic 510. Web interface wrappers 512 may also determine the input parameters to be utilized by the method and may represent the input parameters as a string or byte array. The string or byte array may also specify the method to be invoked in addition to or in lieu of the URI. The string or byte array are included as part of the payload of the send method.

Emulated network request logic 520 receives the network request API calls and translates the network request API call(s) to API call(s) that are suitable for transmission to emulated web server framework 522 (instead of generating an actual network request as described above with reference to FIG. 2). For example, emulated network request logic 520 may translate the network request API call(s) so that they are compatible with the plug-in interface of emulated web server framework 522. Moreover, the plug-in framework provided by container 501 may also convert the payload so that is compatible with emulated web server framework 522. For example, in an embodiment in which emulated web server framework 522 is implemented with a programming language such as C#, the plug-in framework may translate the payload provided by the corresponding web interface wrapper 512 (which, for example, may be a JaysScript payload) to a C#-compatible payload.

Emulated web server framework 522 receives the translated API call(s) via its plug-in interface. Emulated web server framework 522 may analyze the URI and/or payload included in the API call(s) and determine the method of business logic 510 that is to be invoked. Because web controllers 514 are expecting a network request object, emulated web server framework 522 may generate a network request object of a form suitable for processing by business logic 510 and web controllers 514. In accordance with an embodiment, the web controllers 514 and business logic 510 may be configured to operate on a payload having a different object type. For example, business logic 510 and web controllers 514 may not be operable to receive string object types, but instead operable to receive stream object types. Accordingly, emulated web server framework 522 may translate the payload received from emulated network request logic 520 to a stream object type and include the translated payload into a network request object. The network request object is provided to web controller of web controllers 514 corresponding to the identified method.

The corresponding web controller analyzes the payload to determine the input parameters that are to be provided to the determined method and invokes the determined method of business logic 510 with the determined input parameters. The results of the execution of the method are provided to emulated network request logic 520. For example, the corresponding web controller may generate a network response API with the payload that includes the results. The network response API call is provided to emulated web server framework 522, and emulated web server framework 522 may convert the payload into a format suitable for emulated network request logic 520 (e.g., emulated web server framework 522 converts the payload from a stream object type to a string object type). Emulated web server framework 522 may then generate a network response that includes the converted payload and that is suitable for transmission to emulated network request logic 520 via the plug-in framework and provides the network response to emulated network request logic 520 via the plug-in framework. The plug-in framework may translate the payload into a format suitable with the programming language in which web interface wrappers 512 and presentation logic 508 are implemented (e.g., JavaScript). Upon receiving the network response, emulated network request logic 520 generates an network response object that includes the payload and provides it to the corresponding web controller, and the corresponding web controller provides the payload to the method invoked by presentation logic 508.

Figure 6:
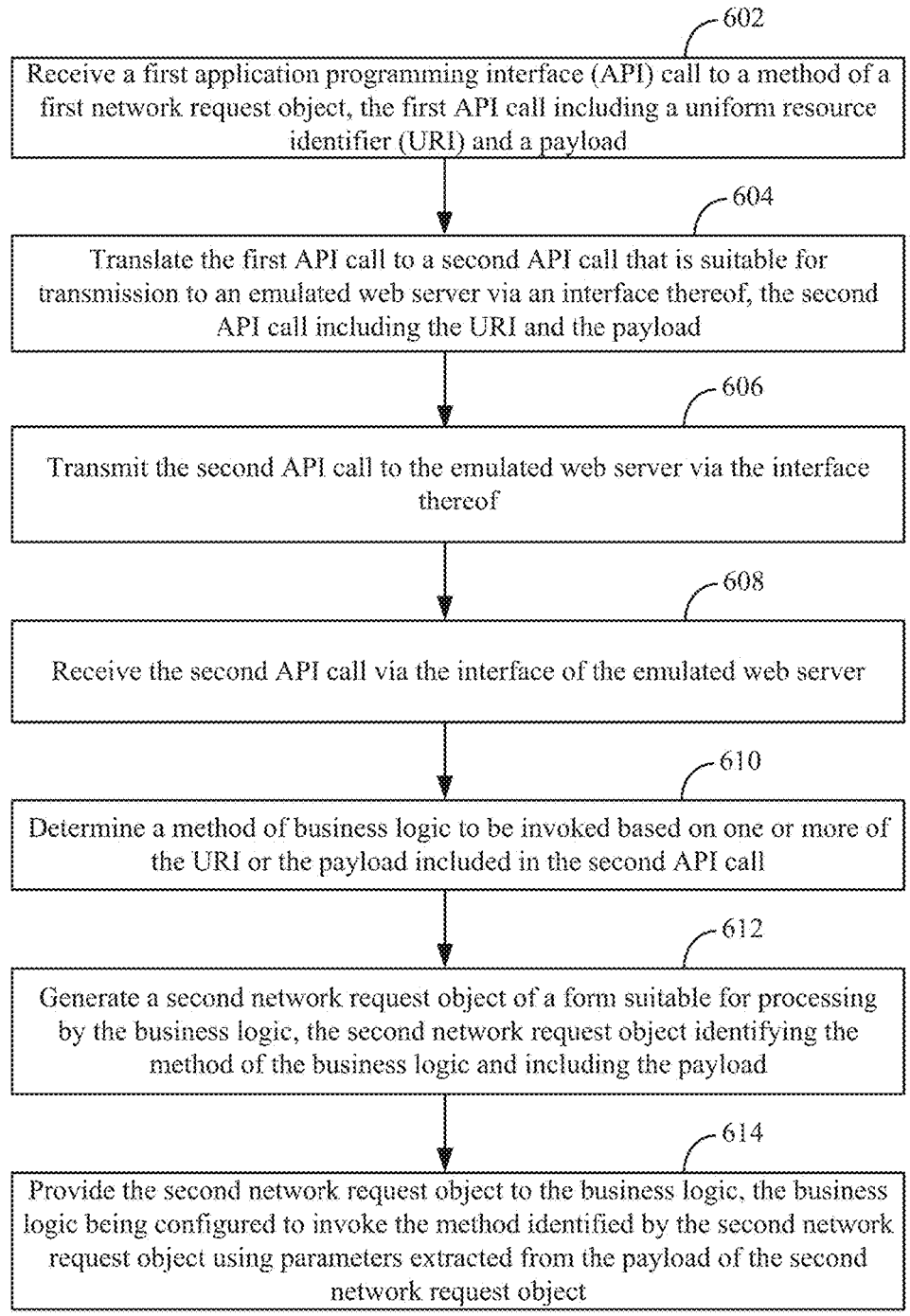
FIG. 6 depicts a flowchart of an example method for implementing and executing a standalone desktop version of an application in accordance with an example embodiment.

Accordingly, a standalone desktop version of an application may be implemented and executed utilizing an emulated network communication channel in many ways. For example, FIG. 6 depicts a flowchart 600 of an example method for implementing and executing a standalone desktop version of an application in accordance with an example embodiment. The application comprises presentation logic, emulated network request logic, an emulated web server, and business logic. The method of flowchart 600 will now be described with continued reference to client device 500 of FIG. 5, although the method is not limited to that implementation. Other structural and operational embodiments will be apparent to persons skilled in the relevant art(s) based on the discussion regarding flowchart 600 and client device 500 of FIG. 5.

As shown in FIG. 6, the method of flowchart 600 begins at step 602, in which a first API call to a method of a first network request object is received from the presentation logic. The first API call includes a URI and a payload. For example, with reference to FIG. 5, emulated network request logic 520 receives a first API call to a method of a first network request object from web interface wrappers 512 of presentation logic 508.

In accordance with one or more embodiments, the URI identifies the emulated web server framework (e.g., emulated web server framework 522).

At step 604, the first API call is translated to a second API call that is suitable for transmission to the emulated web server via an interface thereof, the second API call including the URI and the payload. For example, with reference to FIG. 5, emulated network request logic 520 translates the first API call to a second API call that is suitable for transmission to emulated web server framework 522 via an interface of emulated web server framework 522.

In accordance with one or more embodiments, the interface of the emulated web server (e.g., emulated web server framework 522) is a plug-in interface.

At step 606, the second API call is transmitted to the emulated server via the interface thereof. For example, with reference to FIG. 5, emulated network request logic 520 transmits the second API call to the emulated web server via the interface of the emulated web server.

At step 608, the second API call is received via the interface of the emulated web server. For example, with reference to FIG. 5, emulated web server framework 522 receives the second API call via the interface of emulated web server framework 522.

At step 610, a method of the business logic to be invoked is determined based on one or more of the URI or the payload included in the second API call. For example, with reference to FIG. 5, emulated web server framework 522 determines a method of business logic 510 to be invoked based on one or more of the URI or the payload included in the second API call.

In accordance with one or more embodiments, the presentation logic (e.g., presentation logic 508 is implemented using a first programming language (e.g., JavaScript) and the business logic (e.g., business logic 510) is implemented using a second programming language (e.g., C#) that is different than the first programming language.

At step 612, a second network request object of a form suitable for processing by the business logic is generated, the second network request object identifying the method of the business logic and including the payload. For example, with reference to FIG. 5, emulated web server framework 522 generates a second network request object of a form suitable for processing by business logic 510.

In accordance with one or more embodiments, the second network request object is generated by converting the payload from a first object type to a second object type and generating the second network request object to include the converted payload. For example, with reference to FIG. 5, business logic 510 and web controllers 514 may be configured to be operable with the second object type. Thus, emulated web server framework 522 nay convert the payload from a first object type to the second object type before providing the second network request object. In accordance with an embodiment, the first object type is a string object type and the second object type is a stream object type.

At step 614, the second network request object is provided to the business logic, the business logic being configured to invoke the method identified by the second network request object using parameters extracted from the payload of the second network request object. For example, with reference to FIG. 5, emulated web server framework 522 provides the second network request object to a web controller of web controllers 514 that corresponds to the invoked method of business logic 510. The corresponding web controller extracts input parameters from the payload and invokes the method of business logic 510 with the extracted input parameters.

In accordance with one or more embodiments, the presentation logic (e.g., presentation logic 508) and the business logic (e.g., business logic 510) are operable in both a standalone implementation and a web-based implementation of the application.

Figure 7:
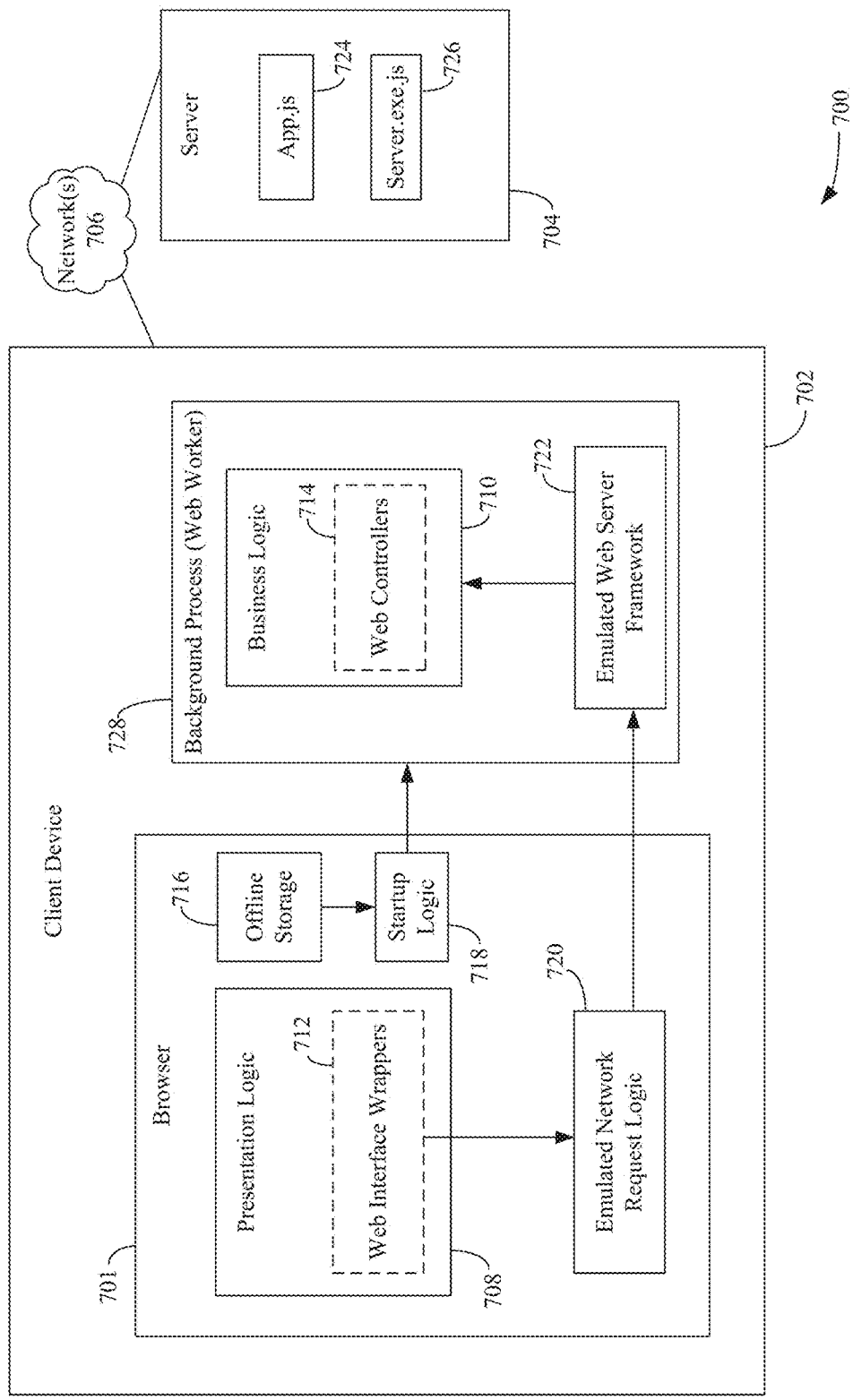
FIG. 7 depicts a block diagram of a system for implementing and executing a web-based implementation of an application in an offline environment by utilizing an emulated network communication channel in accordance with an example embodiment.

For example, FIG. 7 is a block diagram of system 700 for implementing and executing a web-based implementation of the application described with reference to FIGS. 5 and 6 in an offline environment by utilizing an emulated network communication channel in accordance with an example embodiment. As shown in FIG. 7, system 700 includes a client device 702 and a server 704 that are communicatively coupled via network(s) 706. Client device 702 is an example of client device 500, as described above with reference to FIG. 5, and network(s) 706 are examples of network(s) 206, as described above with reference to FIG. 2.

To install the application, client device 702 may download one or more first files 724 (shown as App.js) and one or more second files 726 (shown as server.exe.js) from server 704 via a browser 701 executing on client device 702. First file(s) 724 may comprise code developed using a first programming language (e.g., JavaScript), and one or more second files may comprise code developed using a second programming language (e.g., C# code) that was compiled into the first programming language. First file(s) 724 comprise presentation logic 708, web interface wrappers 712, startup logic 718, and emulated network request logic 720, and second file(s) 726 may comprise business logic 710, web controllers 714, and emulated web server framework 722. Upon browser 701 accessing a web site maintained by server 704, first file(s) 724 and second file(s) 726 are stored in offline storage 716 of browser 701. Offline storage 716 is an example of offline storage 316, as described above with reference to FIG. 3. Presentation logic 708, web interface wrappers 712, business logic 710, and web controllers 714 are examples of presentation logic 508, web interface wrappers 512, business logic 510, and web controllers 514 (as described above with reference to FIG. 5), and operate in the same manner. Emulated network request logic 720 and emulated web server framework 722 are examples of emulated network request logic 520 and emulated web server framework 522, as described above with reference to FIG. 5, and operate in a similar manner, but with some minor differences.

When a user attempts to access server 704 (e.g., by typing the URL of server 704 into browser 701) and client device 702 is offline, browser 701 may detect that the network request to server 704 has failed and may determine whether the application is locally stored in offline storage 716. If browser 701 determines that application is stored in offline storage 716, browser 701 loads first file(s) 724 from offline storage 716 and executes presentation logic 708, web interface wrappers 712, startup logic 718, and emulated network request logic 720. Startup logic 718 may initiate a background process 728 of browser 701 (e.g., a Web Worker) and causes business logic 710, web controllers 714, and emulated web server framework 722 to be executed within background process 728. In accordance with an embodiment, business logic 710, web controllers 714, and emulated web server framework 722 may be executed within an emulated runtime environment (e.g., provided by a .NET framework) executing in background process 728. The emulated runtime environment may provide the necessary toolkits, system runtime libraries, etc. utilized by the compiler to compile second file(s) 726 into the first programming language to ensure that the software components comprising second file(s) (i.e., business logic 710, web controllers 714 and emulated web server framework 722) are executed properly.

When presentation logic 508 invokes a particular method of business logic 710, a corresponding web interface wrapper of web interface wrappers 712 generates network request API call(s) with the intent of causing a network request to be transmitted to a web server. For example, the corresponding web interface wrapper may first invoke an open method of a network request object (e.g., XmlHttpRequest.open( )), and subsequently invoke a send method of the network request object (e.g., XmlHttpRequest.send( )). However, the URI specified in the open method specifies emulated web server framework 722, rather than an actual web server as described above with reference to FIG. 2. The URI may further specify the method to be invoked by business logic 710. The corresponding web interface wrappers may also determine the input parameters to be utilized by the method and may represent the input parameters as a string or byte array. The string or byte array may also specify the method to be invoked in addition to or in lieu of the URI. The string or byte array are included as part of the payload of the send method.

Emulated network request logic 720 receives the network request API call(s) and translates the network request API call(s) to API call(s) that are suitable for transmission to an interface of background process 728 (e.g., a Web Worker API) (instead of generating an actual network request as described above with reference to FIG. 2). Emulated network request logic 720 may also translate the payload into a suitable format depending on the compiler used to compile business logic 710, web controllers 714 and emulated web server framework 722 into the first programming language. For example, certain compilers convert string object types into byte array object types during the compilation process, such that business logic 710, web controllers 714 and emulated web server framework 722 are configured to receive and operate on byte array object types. Thus, emulated network request logic 720 may translate string payloads to byte array payloads and provide API call(s) that include the translated payloads to background process 728.

Background process 728 provides the translated API call(s) to emulated web server framework 722. Emulated web server framework 722 may analyze the URI and/or payload included in the API call(s) and determine the method of business logic 710 that is to be invoked. Because web controllers 714 are expecting a network request object, emulated web server framework 722 may generate a network request object of a form suitable for processing by business logic 710 and web controllers 714. The network request object is provided to web controller of web controllers 514 corresponding to the identified method.

The corresponding web controller analyzes the payload to determine the input parameters that are to be provided to the determined method and invokes the determined method of business logic 710 with the determined input parameters. The results of the execution of the method are provided to emulated network request logic 720. For example, the corresponding web controller generates a network response API with the payload that includes the results. The network response API call is provided to emulated web server framework 722, and emulated web server framework 722 may then generate a network response including the payload that is suitable for transmission to emulated network request logic 720 via the interface of background process 728 and provides network response to emulated network request logic 720. Upon receiving the network response, emulated network request logic 720 generates a network response object that includes the payload and provides it to the corresponding web controller, and the corresponding web controller provides the payload to the method invoked by presentation logic 708.

Figure 8:
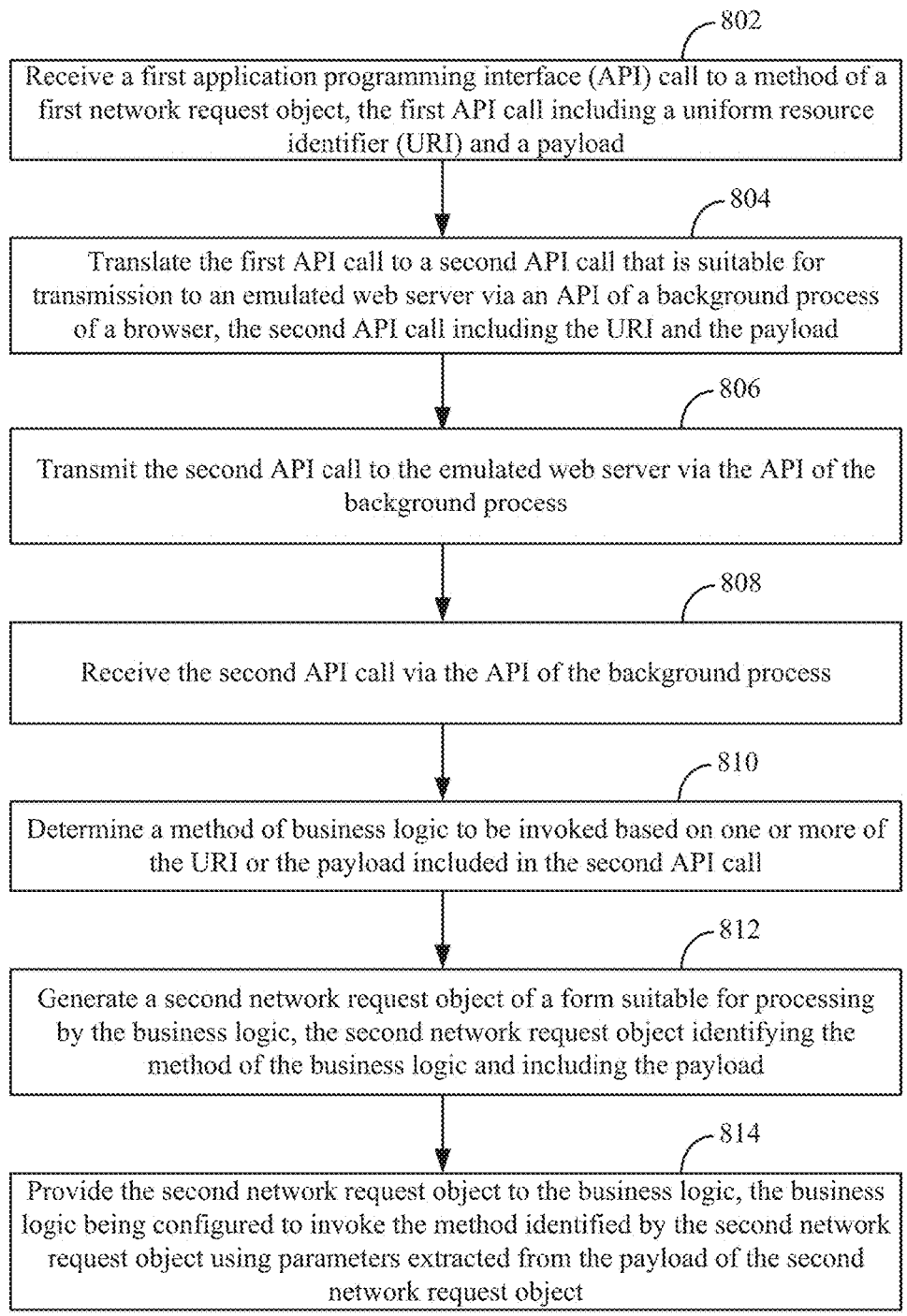
FIG. 8 depicts a flowchart of an example method for implementing and executing a web-based version of an application in an offline environment by utilizing an emulated network communication channel in accordance with an example embodiment.

Accordingly, a web-based version of an application may be implemented and executed utilizing an emulated network communication channel in many ways. For example, FIG. 8 depicts a flowchart 800 of an example method for implementing and executing a web-based version of an application in accordance with an example embodiment. The application comprises presentation logic and emulated network request logic, which execute in a browser of a computing device. The application further comprises an emulated web server and business logic, which execute in a background process of the browser. The method of flowchart 800 will now be described with continued reference to system 700 of FIG. 7, although the method is not limited to that implementation. Other structural and operational embodiments will be apparent to persons skilled in the relevant art(s) based on the discussion regarding flowchart 800 and system 700 of FIG. 7.

As shown in FIG. 8, the method of flowchart 800 begins at step 802, in which a first API call to a method of a first network request object is received from the presentation logic. The first API call including a URI and a payload. For example, with reference to FIG. 7, emulated network request logic 720 receives a first API call to a method of a first network request object from web interface wrappers 712 of presentation logic 708.

In accordance with one or more embodiments, the URI identifies the emulated web server (e.g., emulated web server framework 722).

At step 804, the first API call is translated to a second API call that is suitable for transmission to the emulated web server via an API of the background process, the second API call including the URI and the payload. For example, with reference to FIG. 7, emulated network request logic 720 translates the first API call to a second API call that is suitable for transmission to emulated web server framework 722 via an API of background process 728.

In accordance with one or more embodiments, the background process is a web worker.

In accordance with one or more embodiments, the first API call is translated to a second API call by converting the payload from a first object type to a second object type, the second API call including the converted payload. For example, with reference to FIG. 7, emulated network request logic 720 converts the payload from a first object type (e.g., a string object type) to a second object type (e.g., a byte array object type).

At step 806, the second API call is transmitted to the emulated web server via the API of the background process. For example, with reference to FIG. 7, emulated network request logic 720 transmits the second API call to emulated web server framework 722 via the API of background process 728.

At step 808, the second API call is received via the API of the background process. For example, with reference to FIG. 7, emulated web server framework 722 receives the second API call via the API of background process 728.

At step 810, a method of the business logic to be invoked is determined based on one or more of the URI or the payload included in the second API call. For example, with reference to FIG. 7, emulated web server framework 722 determines a method of business logic 710 based on one or more of the URI or the payload included in the second API call.

At step 812, a second network request object of a form suitable for processing by the business logic is generated, the second network request object identifying the method of the business logic and including the payload. For example, with reference to FIG. 7, emulated web server framework 722 generates a second network request object of a form suitable for processing by business logic 710.

At step 814, the second network request object is provided to the business logic, the business logic being configured to invoke the method identified by the second network request object using parameters extracted from the payload of the second network request object. For example, with reference to FIG. 7, emulated web server framework 722 provides the second network request object to the web controller of web controllers 714 that corresponds to the invoked method of business logic 710. The corresponding web controller extracts input parameters from the payload and invokes the method of business logic 710 with the extracted input parameters.

In accordance with one or more embodiments, the presentation logic (e.g., presentation logic 708) and the business logic (e.g., business logic 710) are operable in both a standalone implementation and a web-based implementation of the application.

In accordance with one or more embodiments, the presentation logic, the emulated network request logic, the emulated web server, and the business logic are stored in a storage area associated with the browser responsive to the browser accessing a web site associated with the application. For example, with reference to FIG. 7, presentation logic 708, emulated network request logic 720, emulated web server framework 722, and business logic 710 are stored in offline storage 716 of browser 701 responsive to browser 701 accessing a web site hosted by server 704 that stores the application.

In accordance with one or more embodiments, the background process is initiated responsive to the browser detecting a failed network request to a web site associated with the application. For example, with reference to FIG. 7, background process 728 is initiated responsive to browser 701 detecting a failed network request to a web site hosted by server 704 that stores the application.

As demonstrated above in the embodiments described with reference to FIGS. 5-8, the same presentation logic, web interface wrappers, web controllers and business logic can be utilized in both a standalone desktop application version and a web-based application version of an application. This is accomplished by utilizing an emulated network communication channel that communicatively couples these software components via a non-network interface. The main difference between the standalone desktop application version and the web-based application version of an application is the type of non-network interface utilized. In particular, the standalone desktop application version may utilize a plug-in interface, whereas the web-based version may utilizes an API of a background process of a browser in which the emulated web server, business logic and web controllers are executed. This advantageously enables developers to develop both versions to have the same function and user experience, while also minimizing the engineering costs to develop and maintain the two versions. In particular, the only components that need to be reengineered are the emulated network request logic and/or emulated web server to support the interface that is used to communicate between the presentation logic and the business logic. However, this merely entails emulating a network request object, which comprises only a handful of API calls.

III. Example Mobile and Stationary Device Embodiments

The systems and methods described above in reference to FIGS. 1-8, may be implemented in hardware, or hardware combined with one or both of software and/or firmware. For example, presentation logic 108, web interface wrappers 112, business logic 110, web controllers 114, presentation logic 208, web interface wrappers 212, network request logic 220, business logic 210, web controllers 214, web server framework 222, presentation logic 208, API adaptors 312, business logic 310, presentation logic 408, web interface wrappers 412, startup logic 416, network request logic 420, web server framework 422, business logic 410, web controllers 414, local server application 404, container 501, presentation logic 508, web interface wrappers 512, emulated network request logic 520, emulated web server framework 522, business logic 510, web controllers 514, browser 701, presentation logic 708, web interface wrappers 712, emulated network request logic 720, startup logic 718, background process 728, business logic 710, web controllers 714, and emulated web server framework 722, and/or each of the components described therein, and flowchart 600 and/or flowchart 800 may be each implemented as computer program code/instructions configured to be executed in one or more processors and stored in a computer readable storage medium. Alternatively, presentation logic 108, web interface wrappers 112, business logic 110, web controllers 114, presentation logic 208, web interface wrappers 212, network request logic 220, business logic 210, web controllers 214, web server framework 222, presentation logic 208, API adaptors 312, business logic 310, presentation logic 408, web interface wrappers 412, startup logic 416, network request logic 420, web server framework 422, business logic 410, web controllers 414, local server application 404, container 501, presentation logic 508, web interface wrappers 512, emulated network request logic 520, emulated web server framework 522, business logic 510, web controllers 514, browser 701, presentation logic 708, web interface wrappers 712, emulated network request logic 720, startup logic 718, background process 728, business logic 710, web controllers 714, and emulated web server framework 722, and/or each of the components described therein, and flowchart 600 and/or flowchart 800 may be implemented as hardware logic/electrical circuitry. In an embodiment, presentation logic 108, web interface wrappers 112, business logic 110, web controllers 114, presentation logic 208, web interface wrappers 212, network request logic 220, business logic 210, web controllers 214, web server framework 222, presentation logic 208, API adaptors 312, business logic 310, presentation logic 408, web interface wrappers 412, startup logic 416, network request logic 420, web server framework 422, business logic 410, web controllers 414, local server application 404, container 501, presentation logic 508, web interface wrappers 512, emulated network request logic 520, emulated web server framework 522, business logic 510, web controllers 514, browser 701, presentation logic 708, web interface wrappers 712, emulated network request logic 720, startup logic 718, background process 728, business logic 710, web controllers 714, and emulated web server framework 722, and/or each of the components described therein, and flowchart 600 and/or flowchart 800 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
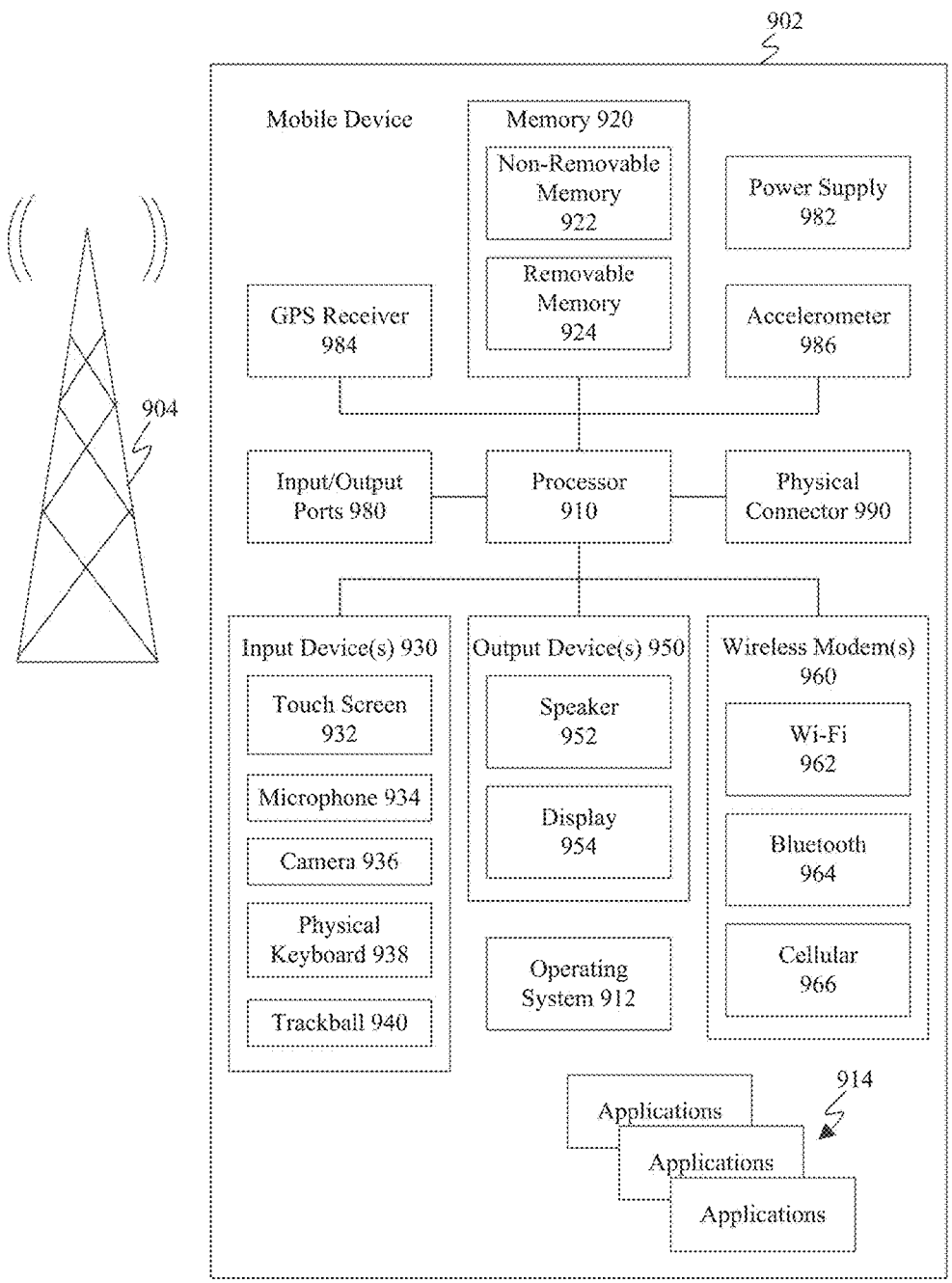
FIG. 9 is a block diagram of an exemplary user device in which embodiments may be implemented.

FIG. 9 shows a block diagram of an exemplary mobile device 900 including a variety of optional hardware and software components, shown generally as components 902.

Any number and combination of the features/elements of presentation logic 108, web interface wrappers 112, business logic 110, web controllers 114, presentation logic 208, web interface wrappers 212, network request logic 220, business logic 210, web controllers 214, web server framework 222, presentation logic 208, API adaptors 312, business logic 310, presentation logic 408, web interface wrappers 412, startup logic 416, network request logic 420, web server framework 422, business logic 410, web controllers 414, local server application 404, container 501, presentation logic 508, web interface wrappers 512, emulated network request logic 520, emulated web server framework 522, business logic 510, web controllers 514, browser 701, presentation logic 708, web interface wrappers 712, emulated network request logic 720, startup logic 718, background process 728, business logic 710, web controllers 714, and emulated web server framework 722, and/or each of the components described therein, and flowchart 600 and/or flowchart 800 may be implemented as components 902 included in a mobile device embodiment, as well as additional and/or alternative features/elements, as would be known to persons skilled in the relevant art(s). It is noted that any of components 902 can communicate with any other of components 902, although not all connections are shown, for ease of illustration. Mobile device 900 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 904, such as a cellular or satellite network, or with a local area or wide area network.

The illustrated mobile device 900 can include a controller or processor referred to as processor circuit 910 for performing such tasks as signal coding, image processing, data processing, input/output processing, power control, and/or other functions. Processor circuit 910 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 910 may execute program code stored in a computer readable medium, such as program code of one or more applications 914, operating system 912, any program code stored in memory 920, etc. Operating system 912 can control the allocation and usage of the components 902 and support for one or more application programs 914 (a.k.a. applications, "apps", etc.). Application programs 914 can include common mobile computing applications (e.g., email applications, calendars, contact managers, web browsers, messaging applications) and any other computing applications (e.g., word processing applications, mapping applications, media player applications).

As illustrated, mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing the systems and methods described above in reference to FIGS. 1-8.

Mobile device 900 can support one or more input devices 930, such as a touch screen 932, microphone 934, camera 936, physical keyboard 938 and/or trackball 940 and one or more output devices 950, such as a speaker 952 and a display 954.

Other possible output devices (not shown) can include piezoelectric or other haptic output devices. Some devices can serve more than one input/output function. For example, touch screen 932 and display 954 can be combined in a single input/output device. The input devices 930 can include a Natural User Interface (NUI).

Wireless modem(s) 960 can be coupled to antenna(s) (not shown) and can support two-way communications between processor circuit 910 and external devices, as is well understood in the art. The modem(s) 960 are shown generically and can include a cellular modem 966 for communicating with the mobile communication network 704 and/or other radio-based modems (e.g., Bluetooth 964 and/or Wi-Fi 962). Cellular modem 966 may be configured to enable phone calls (and optionally transmit data) according to any suitable communication standard or technology, such as GSM, 3G, 4G, 5G, etc. At least one of the wireless modem(s) 960 is typically configured for communication with one or more cellular networks, such as a GSM network for data and voice communications within a single cellular network, between cellular networks, or between the mobile device and a public switched telephone network (PSTN).

Mobile device 900 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be not present and other components can be additionally present as would be recognized by one skilled in the art.

Figure 10:
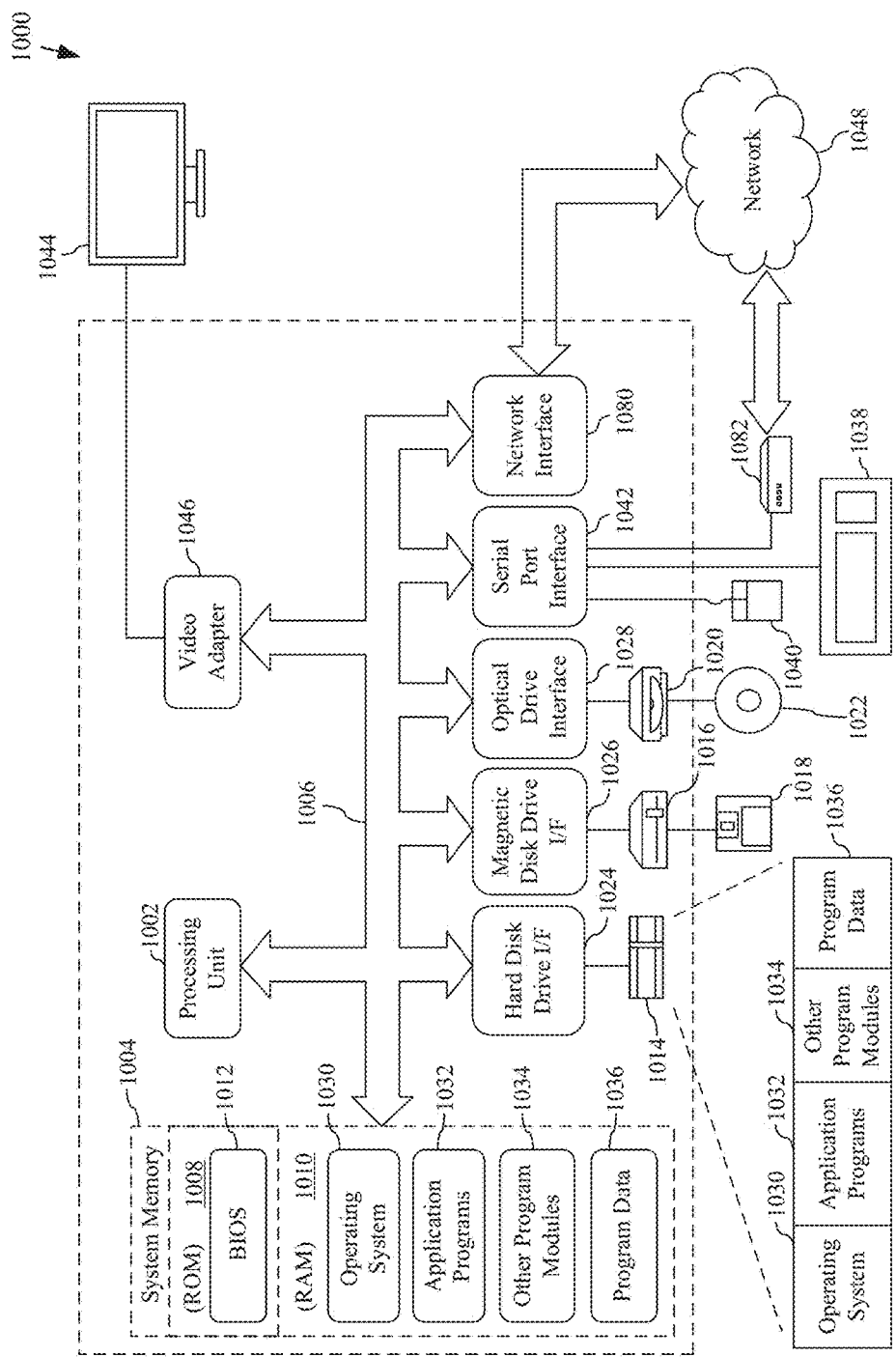
FIG. 10 is a block diagram of an example computing device that may be used to implement embodiments.

Furthermore, FIG. 10 depicts an exemplary implementation of a computing device 800 in which embodiments may be implemented, including presentation logic 108, web interface wrappers 112, business logic 110, web controllers 114, presentation logic 208, web interface wrappers 212, network request logic 220, business logic 210, web controllers 214, web server framework 222, presentation logic 208, API adaptors 312, business logic 310, presentation logic 408, web interface wrappers 412, startup logic 416, network request logic 420, web server framework 422, business logic 410, web controllers 414, local server application 404, container 501, presentation logic 508, web interface wrappers 512, emulated network request logic 520, emulated web server framework 522, business logic 510, web controllers 514, browser 701, presentation logic 708, web interface wrappers 712, emulated network request logic 720, startup logic 718, background process 728, business logic 710, web controllers 714, and emulated web server framework 722, and/or each of the components described therein, and flowchart 600 and/or flowchart 800. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing the systems and methods described above, for example, with reference to FIGS. 1-8.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including system memory 1004 of FIG. 10). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1052, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Embodiments described herein may also be implemented and/or executed via virtual or emulated hardware (e.g., virtual machines) and/or other environments, including, but not limited to, a cloud-computing based environment (e.g., Microsoft Azure by Microsoft Corporation®).

IV. Additional Exemplary Embodiments

A method implemented by an application executing on a computing device is described herein. The application includes presentation logic, emulated network request logic, an emulated web server, and business logic. The method includes, by the emulated network request logic: receiving, from the presentation logic, a first application programming interface (API) call to a method of a first network request object, the first API call including a uniform resource identifier (URI) and a payload; translating the first API call to a second API call that is suitable for transmission to the emulated web server via an interface thereof, the second API call including the URI and the payload; and transmitting the second API call to the emulated web server via the interface thereof; and by the emulated web server: receiving the second API call via the interface of the emulated web server; determining a method of the business logic to be invoked based on one or more of the URI or the payload included in the second API call; generating a second network request object of a form suitable for processing by the business logic, the second network request object identifying the method of the business logic and including the payload; and providing the second network request object to the business logic, the business logic being configured to invoke the method identified by the second network request object using parameters extracted from the payload of the second network request object.

In an embodiment of the method, the presentation logic and the business logic are operable in both a standalone implementation and a web-based implementation of the application.

In an embodiment of the method, the URI identifies the emulated web server.

In an embodiment of the method, generating the second network request object comprises: converting the payload from a first object type to a second object type; and generating the second network request object to include the converted payload.

In an embodiment of the method, the presentation logic is implemented using a first programming language and the business logic is implemented using a second programming language that is different than the first programming language.

In an embodiment of the method, the interface of the emulated web server is a plug-in interface.

A method implemented by an application executing in a browser of a computing device is also described herein. The application includes presentation logic, emulated network request logic, an emulated web server, and business logic, the emulated web server and the business logic executing in a background process of the browser. The method includes, by the emulated network request logic: receiving, from the presentation logic, a first application programming interface (API) call to a method of a first network request object, the first API call including a uniform resource identifier (URI) and a payload; translating the first API call to a second API call that is suitable for transmission to the emulated web server via an API of the background process, the second API call including the URI and the payload; and transmitting the second API call to the emulated web server via the API of the background process; and by the emulated web server: receiving the second API call via the API of the background process; determining a method of the business logic to be invoked based on one or more of the URI or the payload included in the second API call; generating a second network request object of a form suitable for processing by the business logic, the second network request object identifying the method of the business logic and including the payload; and providing the second network request object to the business logic, the business logic being configured to invoke the method identified by the second network request object using parameters extracted from the payload of the second network request object.

In an embodiment of the method, the background process is a web worker.

In an embodiment of the method, the presentation logic, the emulated network request logic, the emulated web server, and the business logic are stored in a storage area associated with the browser responsive to the browser accessing a web site associated with the application.

In an embodiment of the method, the background process is initiated responsive to the browser detecting a failed network request to a web site associated with the application.

In an embodiment of the method, the presentation logic and the business logic are operable in both a standalone implementation and a web-based implementation of the application.

In an embodiment of the method, the URI identifies the emulated web server.

In an embodiment of the method, translating the first API call to a second API call comprises: converting the payload from a first object type to a second object type, the second API call including the converted payload.

A computing device is also described herein. The computing device includes at least one processor circuit and at least one memory that stores program code configured to be executed by the at least one processor circuit. The program code includes: an application configured to be executed in a browser of the computing device, the application comprising presentation logic, emulated network request logic, an emulated web server, and business logic, the emulated web server and the business logic configured to be executed in a background process of the browser, the emulated network request logic configured to: receive, from the presentation logic, a first application programming interface (API) call to a method of a first network request object, the first API call including a uniform resource identifier (URI) and a payload; translate the first API call to a second API call that is suitable for transmission to the emulated web server via an API of the background process, the second API call including the URI and the payload; and transmit the second API call to the emulated web server via the API of the background process; and the emulated web server configured to: receive the second API call via the API of the background process; determine a method of the business logic to be invoked based on one or more of the URI or the payload included in the second API call; generate a second network request object of a form suitable for processing by the business logic, the second network request object identifying the method of the business logic and including the payload; and provide the second network request object to the business logic, the business logic being configured to invoke the method identified by the second network request object using parameters extracted from the payload of the second network request object.

In an embodiment of the computing device, the background process is a web worker.

In an embodiment of the computing device, the presentation logic, the emulated network request logic, the emulated web server, and the business logic are stored in a storage area associated with the browser responsive to the browser accessing a web site associated with the application.

In an embodiment of the computing device, the background process is initiated responsive to the browser detecting a failed network request to a web site associated with the application.

In an embodiment of the computing device, the presentation logic and business logic are operable in both a standalone implementation and a web-based implementation of the application.

In an embodiment of the computing device, the URI identifies the emulated web server.

In an embodiment of the computing device, the emulated network request logic is configured to translate the first API call to a second API call by: converting the payload from a first object type to a second object type, the second API call including the converted payload.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method implemented by an application executing on a computing device, the application comprising presentation logic, emulated network request logic, an emulated web server, and business logic, the method comprising:
    by the emulated network request logic:
        receiving, from the presentation logic, a first application programming interface (API) call to a method of a first network request object, the first API call including a uniform resource identifier (URI) and a payload;
        translating the first API call to a second API call that is suitable for transmission to the emulated web server via an interface thereof, the second API call including the URI and the payload; and
        transmitting the second API call to the emulated web server via the interface thereof; and
    by the emulated web server:
        receiving the second API call via the interface of the emulated web server;
        determining a method of the business logic to be invoked based on one or more of the URI or the payload included in the second API call;
        generating a second network request object of a form suitable for processing by the business logic, the second network request object identifying the method of the business logic and including the payload; and
        providing the second network request object to the business logic, the business logic being configured to invoke the method identified by the second network request object using parameters extracted from the payload of the second network request object.

2. The method of claim 1, wherein the presentation logic and the business logic are operable in both a standalone implementation and a web-based implementation of the application.

3. The method of claim 1, wherein the URI identifies the emulated web server.

4. The method of claim 1, wherein generating the second network request object comprises:
    converting the payload from a first object type to a second object type; and
    generating the second network request object to include the converted payload.

5. The method of claim 1, wherein the presentation logic is implemented using a first programming language and the business logic is implemented using a second programming language that is different than the first programming language.

6. The method of claim 1, wherein the interface of the emulated web server is a plug-in interface.

7. A method implemented by an application executing in a browser of a computing device, the application comprising presentation logic, emulated network request logic, an emulated web server, and business logic, the emulated web server and the business logic executing in a background process of the browser, the method comprising:
    by the emulated network request logic:
        receiving, from the presentation logic, a first application programming interface (API) call to a method of a first network request object, the first API call including a uniform resource identifier (URI) and a payload;
        translating the first API call to a second API call that is suitable for transmission to the emulated web server via an API of the background process, the second API call including the URI and the payload; and
        transmitting the second API call to the emulated web server via the API of the background process; and
    by the emulated web server:
        receiving the second API call via the API of the background process;
        determining a method of the business logic to be invoked based on one or more of the URI or the payload included in the second API call;
        generating a second network request object of a form suitable for processing by the business logic, the second network request object identifying the method of the business logic and including the payload; and
        providing the second network request object to the business logic, the business logic being configured to invoke the method identified by the second network request object using parameters extracted from the payload of the second network request object.

8. The method of claim 7, wherein the background process is a web worker.

9. The method of claim 7, wherein the presentation logic, the emulated network request logic, the emulated web server, and the business logic are stored in a storage area associated with the browser responsive to the browser accessing a web site associated with the application.

10. The method of claim 7, wherein the background process is initiated responsive to the browser detecting a failed network request to a web site associated with the application.

11. The method of claim 7, wherein the presentation logic and the business logic are operable in both a standalone implementation and a web-based implementation of the application.

12. The method of claim 7, wherein the URI identifies the emulated web server.

13. The method of claim 7, wherein translating the first API call to a second API call comprises:
    converting the payload from a first object type to a second object type, the second API call including the converted payload.

14. A computing device, comprising:
   at least one processor circuit; and
   at least one memory that stores program code configured to be executed by the at least one processor circuit, the program code comprising:
   an application configured to be executed in a browser of the computing device, the application comprising presentation logic, emulated network request logic, an emulated web server, and business logic, the emulated web server and the business logic configured to be executed in a background process of the browser,
   the emulated network request logic configured to:
      receive, from the presentation logic, a first application programming interface (API) call to a method of a first network request object, the first API call including a uniform resource identifier (URI) and a payload;
      translate the first API call to a second API call that is suitable for transmission to the emulated web server via an API of the background process, the second API call including the URI and the payload; and
      transmit the second API call to the emulated web server via the API of the background process; and
   the emulated web server configured to:
      receive the second API call via the API of the background process;
      determine a method of the business logic to be invoked based on one or more of the URI or the payload included in the second API call;
      generate a second network request object of a form suitable for processing by the business logic, the second network request object identifying the method of the business logic and including the payload; and
      provide the second network request object to the business logic, the business logic being configured to invoke the method identified by the second network request object using parameters extracted from the payload of the second network request object.

15. The computing device of claim 14, wherein the background process is a web worker.

16. The computing device of claim 14, wherein the presentation logic, the emulated network request logic, the emulated web server, and the business logic are stored in a storage area associated with the browser responsive to the browser accessing a web site associated with the application.

17. The computing device of claim 14, wherein the background process is initiated responsive to the browser detecting a failed network request to a web site associated with the application.

18. The computing device of claim 14, wherein the presentation logic and business logic are operable in both a standalone implementation and a web-based implementation of the application.

19. The computing device of claim 14, wherein the URI identifies the emulated web server.

20. The computing device of claim 14, wherein the emulated network request logic is configured to translate the first API call to a second API call by:
   converting the payload from a first object type to a second object type, the second API call including the converted payload.

* * * * *